UNITED STATES PATENT OFFICE.

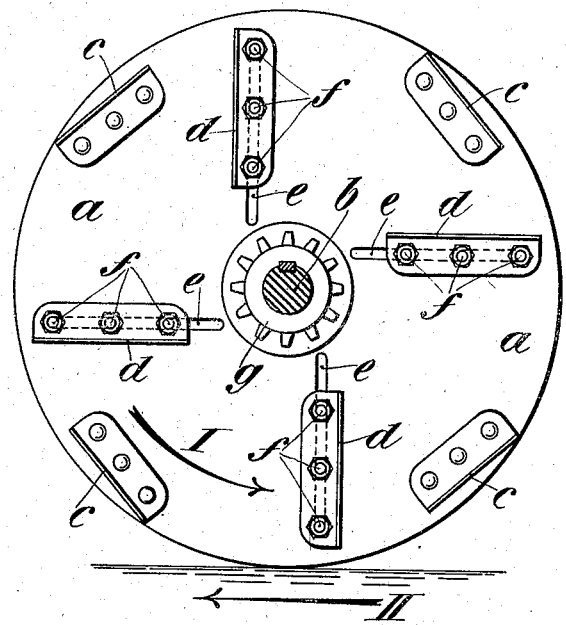
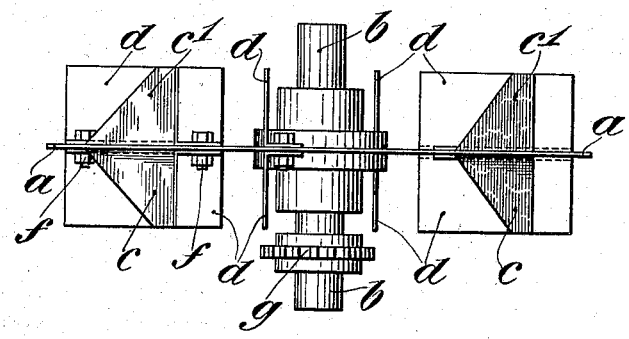

KARL KOSZEGI, OF BAJA, AND EMIL SZECHENYI, OF VAJSZKA, AUSTRIA-HUNGARY.

CULTIVATING-MACHINE.

941,422.  Specification of Letters Patent.  Patented Nov. 30, 1909.

Application filed March 29, 1909. Serial No. 486,577.

*To all whom it may concern:*

Be it known that we, KARL KOSZEGI and Count EMIL SZECHENYI, subjects of the King of Hungary, and residents of Baja, Austria-Hungary, and Vajszka, Bács-Bodrog-megye, Austria-Hungary, respectively, have invented a certain new and useful Improvement in Cultivating-Machines, of which the following is a specification.

The present invention relates to cultivating machines and has for its object to provide an improved soil and stubble turning device which, when suitably adjusted, will work also as a deep-soil disintegrator, to effect the digging up and turning of the soil to be cultivated not only on the surface but also to any desired depth, with the minimum expenditure of power and in less time than was previously possible, without the progress of the work being interfered with by obstacles such as roots, stones, etc., or of damage being caused by the latter.

The improved device consists substantially of a thin disk disposed in a vertical plane and rotating at a great speed in the direction of the travel of the machine. The said disk is provided on both sides with half hoe-plates perpendicular thereto which are uniformly and symmetrically distributed thereon and arranged tangentially to the direction of rotation: two corresponding half hoe-plates, one at each side of the disk, forming a complete hoe. On the disk behind each hoe are arranged blades also perpendicular to the disk but inclined at an angle of about 50° or 60° to the hoe plate and adjustable in radial direction. The said disk is mounted on a horizontal shaft in such manner that the disk rests with its edge on the soil by its own weight and is free to move in a vertical direction.

The hoes enter easily into the ground previously scored by the disk and cut and turn the soil in rapid succession, while the blades following the hoes thoroughly disintegrate and scatter the soil. If very hard obstacles (stones, metals, etc.) are encountered by the disk, the latter is raised thereby and simply rolls over them so that no damage or stoppage can be caused.

The improved soil turning and deep soil disintegrating device is illustrated in Figure 1 in side elevation and in Fig. 2 in plan.

$a$ is the thin disk made preferably of sheet steel and mounted on the horizontal shaft $b$. $c$ and $c^1$ are the half hoe-plates symmetrically and uniformly distributed and attached on both sides of the disk, in such manner that two plates $c$ and $c^1$ form a complete hoe which is divided on its axis of symmetry by the disk $a$, and perpendicular to the latter and tangential to the direction of rotation.

$d$, $d$ are the blades arranged perpendicularly and symmetrically on both sides of the disk $a$ behind each hoe $c$, $c^1$ at an angle of 50° to 60° to the latter; the distance of the outer edges of said blades from the hoes being approximately the length of the latter. The blades $d$, $d$ are secured to the disk by means of bolts $f$ passing through slots $e$ in the disk $a$, and may be adjusted in radial direction: $g$ is a sprocket wheel keyed on the shaft $b$ driving the disk $a$. The disk $a$ is carried by the cultivating machine, which may be of any known self-propelling type, on a shaft $b$ in such manner that the disk always rests with its edge upon the ground and can move freely up and down notwithstanding the chain drive. The device may be attached to a cultivating machine in any suitable manner.

The *modus operandi* of the improved device is as follows:—If the soil is to be thoroughly dug up and turned, the blades $d$ on the disk $a$ must be fixed nearer the circumference of the latter so that their extreme edges lie exactly in the path of the hoes $c$, $c^1$. The blades $d$, $d$ being fixed in this position, the disk $a$ is rapidly rotated in the direction of the arrow I, while the machine and therefore the disk simultaneously receive continuous motion in the direction of the arrow II.

In consequence of the rapid rotation (300 revolutions and more per minute), the edge of the disk $a$ bearing freely on the ground with its own weight, scores the soil: the hoes $c$, $c^1$ cut in rapid succession through the soil previously scored by the disk $a$. Advancing in layers farther into the ground, while the blades $d$, $d$ following each hoe, disintegrate and rake at once the layers of earth just cut, throwing it out behind the disk $a$ in thoroughly disintegrated condition.

The improved device works consequently in the manner of a milling cutter. If obstacles such as roots, wood, soft stones, etc., are encountered by the disk $a$, they are partly cut up and removed by the hoes and blades by abrasion. If the obstacles are too hard the disk $a$ simply rises in passing over them. If, however, only the upper layer of the soil is to be dug up and turned, while the lower layers are only to be loosened, the blades $d, d$ on the disk $a$ must be fixed closer to the shaft $b$ so that their extreme edges lie in a circle smaller than the path of the hoes. Consequently, if the device is operated in the same manner as above described, there will be an annular zone between the paths of the blades and hoes, the soil in which, although cut up and loosened by the hoes, is not reached by the blades and is therefore not turned and thrown out, but remains loosely disintegrated. The upper layer, however, which is reached by the blades, is turned and thrown out as described. The nearer the blades $d, d$ are brought toward the disk shaft $b$, the thicker will be the layer disintegrated only by the hoe; it is thus possible to regulate the disintegration as desired by suitably adjusting the position of the blades. The working depth may also be regulated by loading the shaft $b$ and changing the speed of travel, the depth being increased by a greater load on the disk and by a slower travel, and the depth being diminished with a lighter load and quicker travel.

Having described our invention, what we claim is:—

An attachment for soil cultivating machines for turning soil and stubble and disintegrating deep soil comprising a thin disk, uniformly distributed hoes on said disk and approximately radial adjustable blades on said disk, as and for the purpose specified.

In testimony whereof we have signed our names to this specification in the presence of two subscribing witnesses.

KARL KOSZEGI.
EMIL SZÉCHENYI.

Witnesses.
J. KANNAY,
JOSEF HELLER.